United States Patent [19]

Villemin et al.

[11] Patent Number: 5,021,024

[45] Date of Patent: Jun. 4, 1991

[54] CUTTING UP FOWL

[75] Inventors: Daniel Villemin, Chennevieres S/Marne; Janusz Plusa, Champigny sur Marne; Daniel Guilbaud, Saint Fulgent; Jean Leclere, Creteil; Paul Romand, Valence, all of France

[73] Assignees: Etablissements Arrive S.A., Saint Fulgent; Union Financiere pour le Developpement de L'Economie Cerealiere - Unigrains, Paris, both of France

[21] Appl. No.: 491,677

[22] Filed: Mar. 12, 1990

[30] Foreign Application Priority Data

Mar. 13, 1989 [FR] France ............................... 89 03709

[51] Int. Cl.⁵ ............................................ A22C 21/00
[52] U.S. Cl. ..................................... 452/149; 452/150; 452/155
[58] Field of Search ............... 452/149, 150, 154, 155, 452/165, 169, 170

[56] References Cited

U.S. PATENT DOCUMENTS

| | | | |
|---|---|---|---|
| 3,943,600 | 3/1976 | Cramer | 452/149 |
| 4,477,942 | 10/1984 | Martin et al. | 452/165 |
| 4,503,587 | 3/1985 | Martin | 452/169 |
| 4,669,148 | 6/1987 | Scheier | 452/165 |
| 4,715,092 | 12/1987 | Lerner et al. | 452/154 |
| 4,815,168 | 3/1989 | van den Nieuwe Laar et al. | 452/149 |

Primary Examiner—Willis Little
Attorney, Agent, or Firm—Herbert Dubno; Andrew Wilford

[57] ABSTRACT

A bird is cut up by cutting free the fillets, that is the large portions of breast meat, loosening the wings, dislocating the thighs, and at the end removing as one piece a subassembly comprised of the thighs, the fillets, and the wings. More particularly the fillets are freed in two steps, namely first they are partially from the skeleton starting from the sternum, and then, after the wings have been loosened, the cut is completed. In addition the coracoids are cut between the two stages of fillet-freeing, and the pygostyle is ripped or cut off at the end of the process. The bird to be cut up is fixed on a holder that fits within the thoracic cavity of the bird and remains on this holder through all of above-described treatment steps.

17 Claims, 4 Drawing Sheets

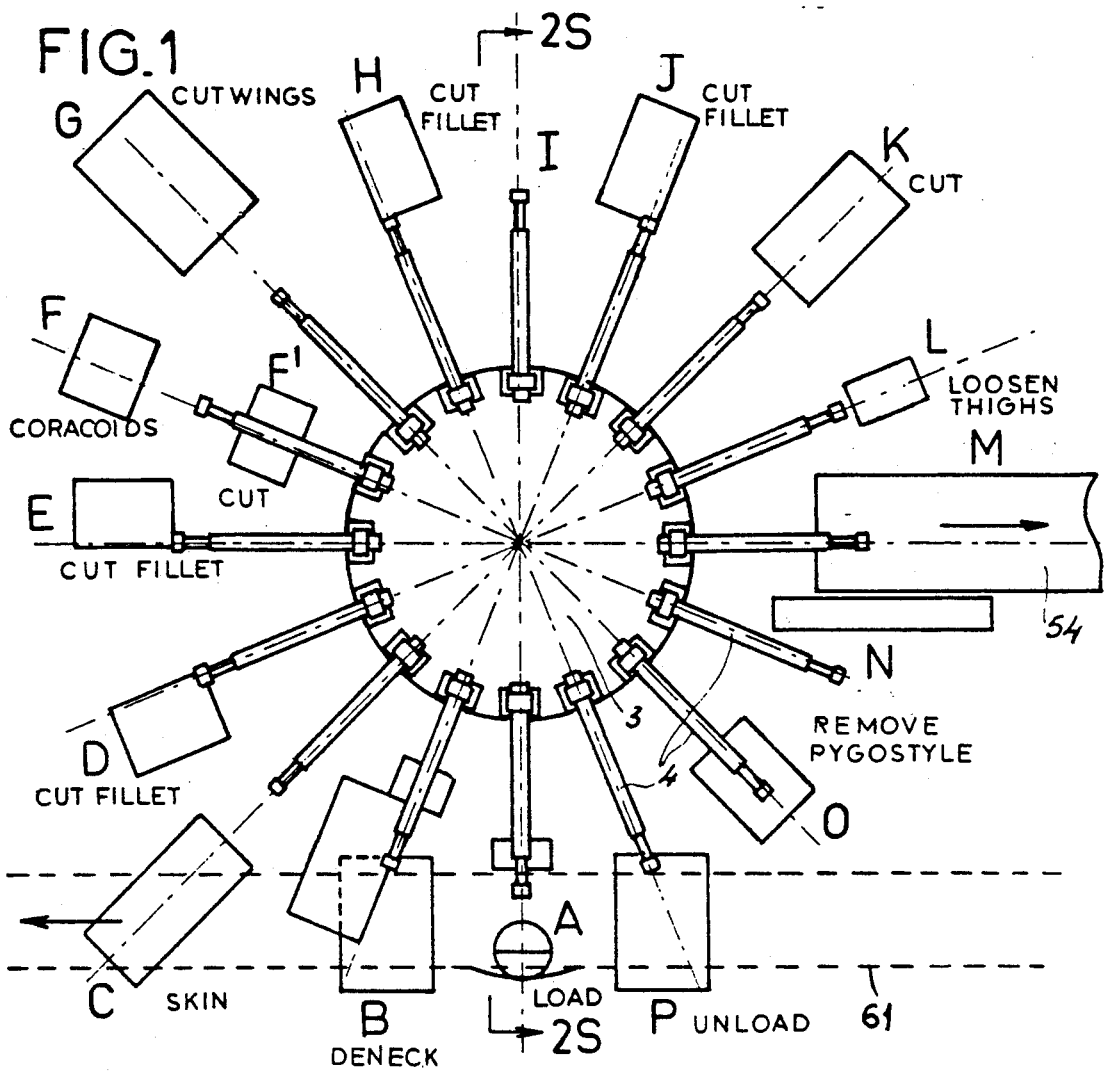
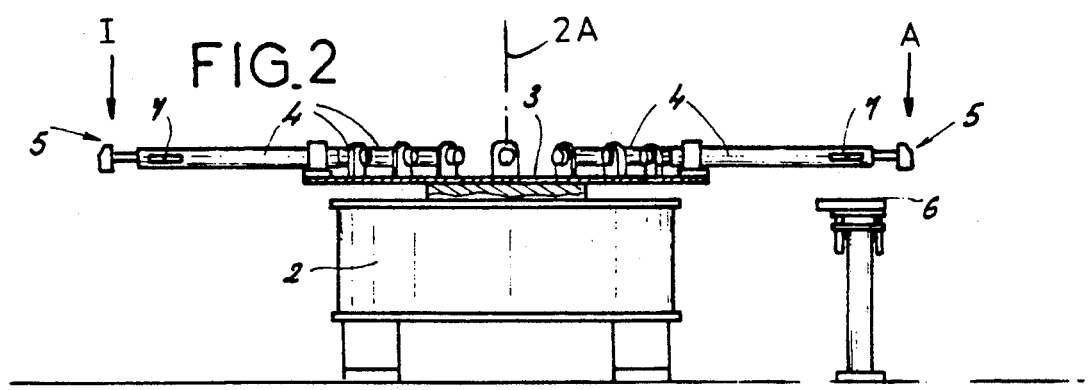

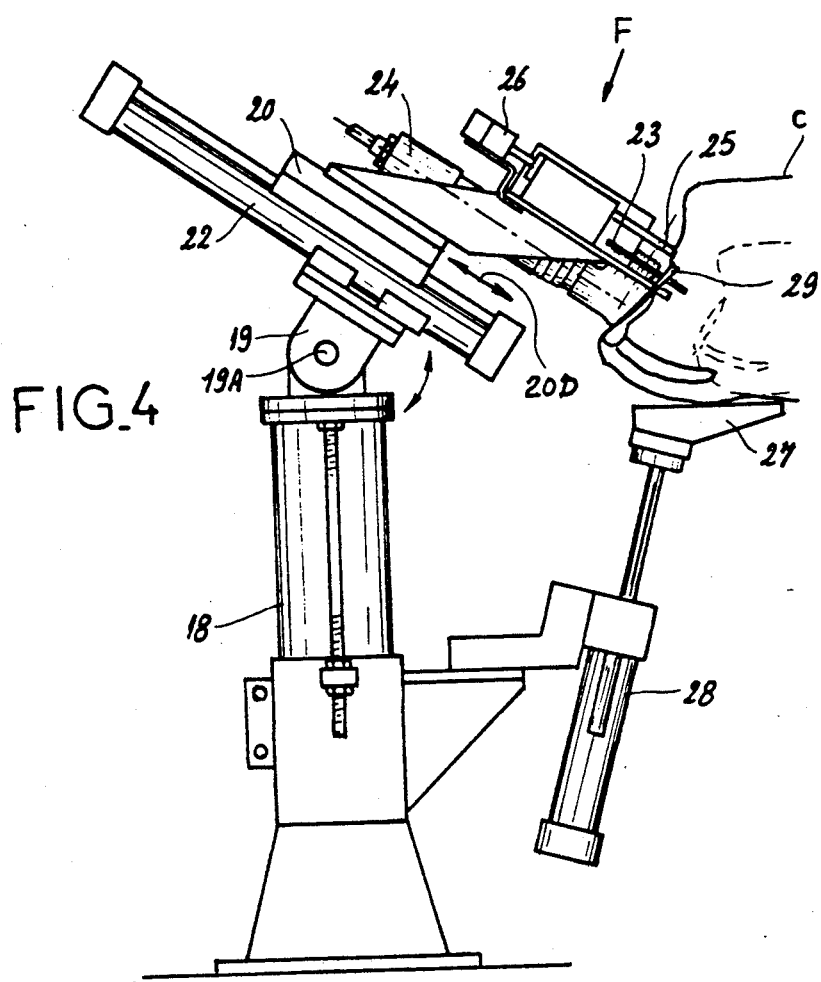
FIG_4
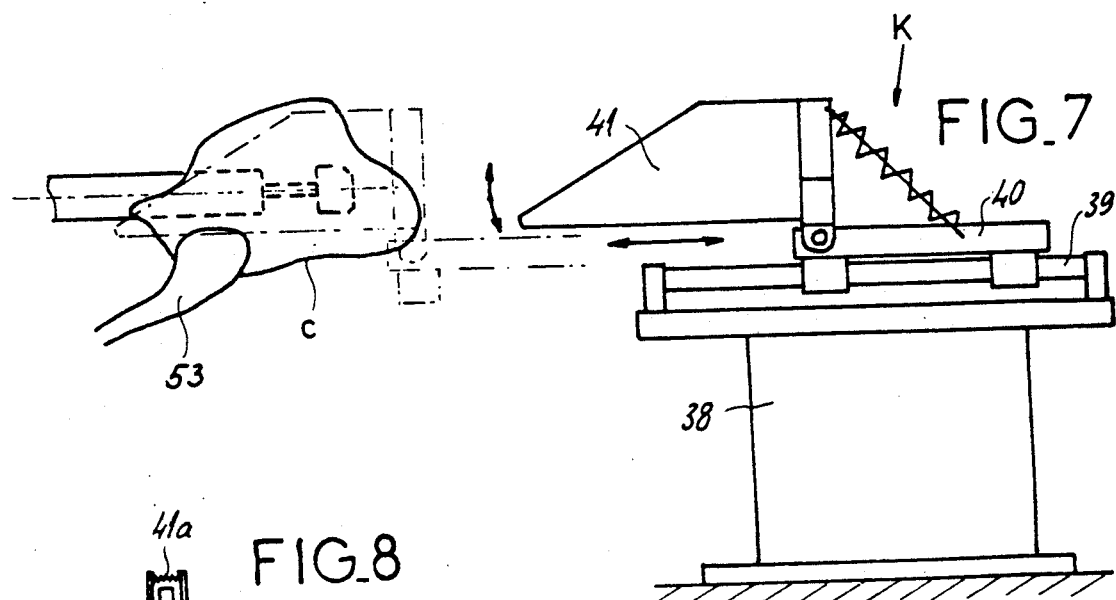
FIG_7
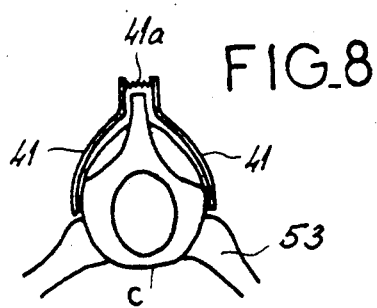
FIG_8

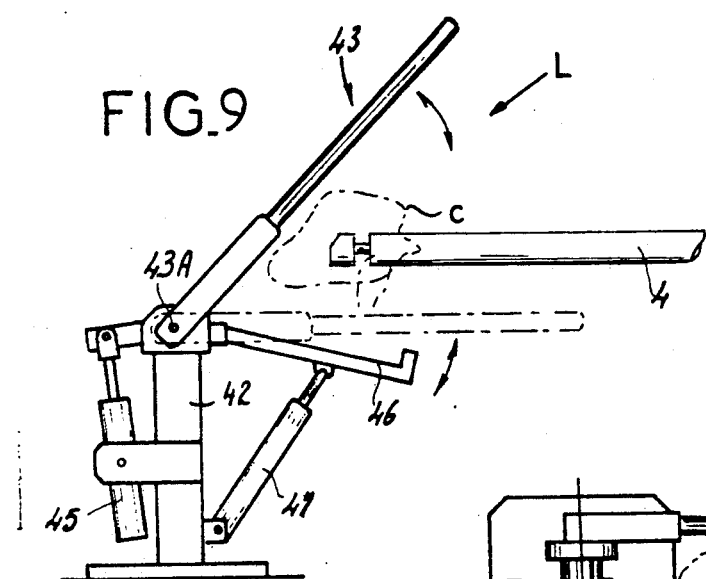
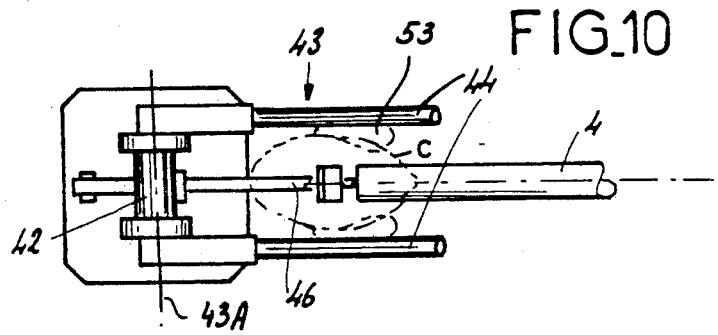
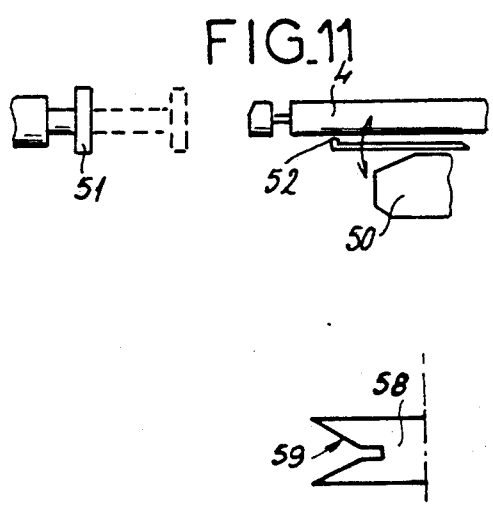
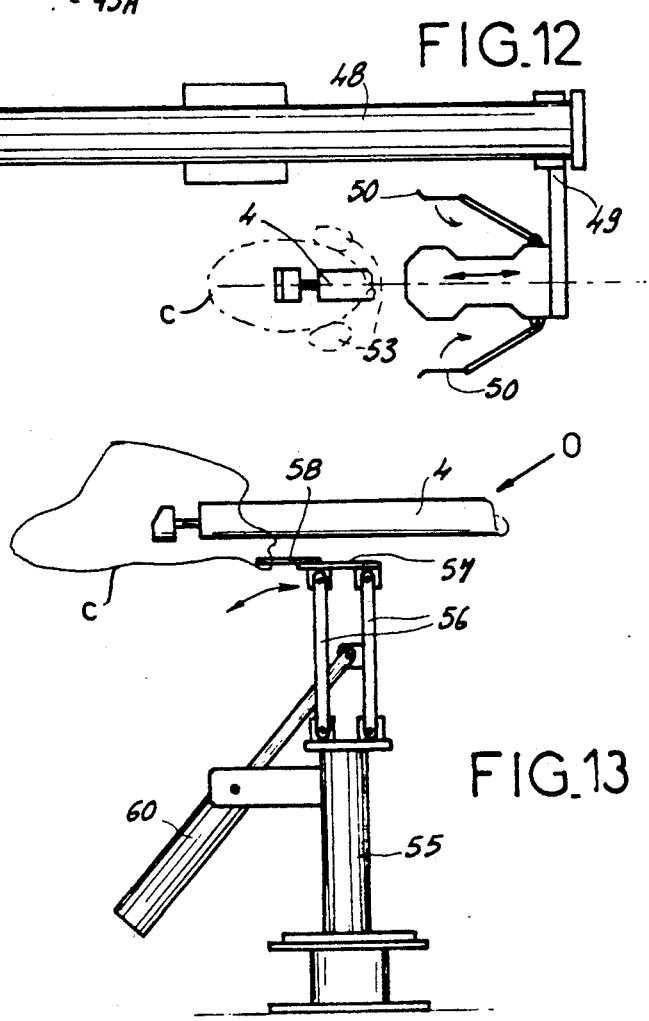

CUTTING UP FOWL

FIELD OF THE INVENTION

The present invention relates to cutting up fowl. More particularly this invention concerns an automatic method of and apparatus for cutting up birds, such as chickens or turkeys.

BACKGROUND OF THE INVENTION

In the preparation of a large bird for sale it is standard to cut the bird up after slaughter into several pieces. A turkey is cleaned by removing the viscera and then rinsing the animal. Then the bird is hung from a conveyor chain which moves it through a plurality of stations at which pieces are cut off it, it is deboned, and so on. Clearly this process requires a substantial amount of manual work and has the considerable disadvantage that the quality of the end product depends directly on the abilities of the people doing the various steps. Furthermore, a normally significant amount of meat is left hanging on the body or lodged in cavities thereof.

The general morphology of a fowl is comprised generally as follows:

- The front end of the thorax is closed by a bony architecture defined by the vertebral column, the base of the neck of the animal, the clavicles, and the coracoids.
- The central part of the body is defined by the vertebral column, the ribs, and the sternum.
- The rear part of the more or less concave pelvis ending in the pygostyle and the ischium includes joint regions for the femurs as well as the iliac fossae.

Because of the complexity of this structure it is very difficult to completely separate the meat from the skeleton.

As a result of this complexity the known cutting or meat-stripping machines remove the wings, thighs, and filets, that is the large masses of breast meat, in separate operations. Some of the better pieces are not removed carefully, for example a part of the meat forming the filet can rest on the respective thigh so that each of the pieces is worth somewhat less than it should. The result is therefore that sloppy stripping costs the meat-packing operation in lost profit.

On the other hand the known methods and apparatuses, whether manual or automatic have various limitations. The main problem is that they require that the bird be held by a through-going rod which gets in the way of many meat- or part-removing operations. Furthermore the known systems normally require that the filets be removed on a separate machine altogether and in any case it is difficult to adapt the known systems to birds of different sizes.

OBJECTS OF THE INVENTION

It is therefore an object of the present invention to provide an improved method of and apparatus for cutting up fowl.

Another object is the provision of such an improved method of and apparatus for cutting up fowl which overcomes the above-given disadvantages, that is which allows a bird carcass to be neatly subdivided into parts and stripped of meat in a wholly automatic operation.

SUMMARY OF THE INVENTION

A method of cutting up a bird basically comprises the steps of cutting free the fillets, that is the large portions of breast meat, loosening the wings, dislocating the thighs, and at the end removing as one piece a subassembly comprised of the thighs, the fillets, and the wings. More particularly according to this invention the fillets are freed in two steps, namely first they are partially from the skeleton starting from the sternum, and then, after the wings have been loosened, the cut is completed. In addition the coracoids are cut between the two stages of fillet-freeing, and the pygostyle is ripped or cut off at the end of the process.

This method therefore produces a meaty jacket or subassembly that can easily be subdivided accurately by hand into the most valuable pieces of the bird: the drumsticks, the wings, and the fillets. Virtually no usable meat is left on the skeleton of the bird.

According to another feature of this invention the bird to be cut up according to this invention is fixed on a holder that fits within the thoracic cavity of the bird and remains on this holder through all of above-described treatment steps. The use if an internal-type holder of the type described in commonly owned U.S. Pat. No. 4,656,692 makes it possible to strip the useful meat off the skeleton without the holder getting in the way at all.

Since according to this invention the bird is held internally, the method comprises the step of cutting the neck and neck tendons off the bird. Furthemore, to facilitate freeing of the fillets a double incision is cut into the skin of the bird along each side of the sternum.

To ease freeing of the above-described jacket according to this invention in two parts the skin and meat of the bird is also cut along the vertebral column. Further more after the coracoids are cut a vertical cut is made to each side of the ischium and a second horizontal cut thereabove to loosen the thigh meat.

The apparatus for carrying out the method of this invention comprises a turntable rotatable about an upright central axis and provided with a plurality of generally angularly equispaced holders adapted to fit within respective birds to be cut up radially generally equispaced from the axis. This turntable is rotated through angular steps and so as to index the holders through respective treatment stations from an upstream loading station to a downstream unloading station. In this manner several birds can be worked on simultaneously, so that the apparatus of this invention lends itself readily to a high-volume mass-production operation.

In accordance with this invention the two incisions formed in the bird along each side of the sternum and the single incision into the bird along the vertebral column are formed by a device having a carriage displaceable radially of the axis, upper and lower arms pivotal on the carriage about horizontal axes and having outer ends respectively positionable above and below the bird in the respective station generally at the sternum and vertebral column of the bird, a double rotary blade carried on one of the outer ends and engageable at the sternum, and a single rotary blade carried on the other outer end and engageable at the vertebral column. A controller for the apparatus detects the presence of a bird in the respective station, pivots the arms together while rotating the blades to cut into the bird, and displaces the carriage radially of the axis to make the respective incisions.

The means for cutting the coracoids includes a carriage displaceable generally radially of the axis at the respective station, a flat and generally circular saw blade rotatable on the carriage about an upright axis generally perpendicular to the direction of displacement of the carriage, and a support for bracing the bird at the respective station. The controller detects the presence of the bird in the respective station, braces the bird, and advances the saw blade while rotating it into the bird so as to cut the coracoids.

A pair of vertically displaceable blades at a station downstream of the coracoid-cutting station form a vertical cut to each side of the ischium of the bird. These blades are pivotal about a vertical axis and are provided with means for automatically aligning them with the bird in the respective station. Furthermore two blades are provided at a station downstream of the coracoid-cutting station displaceable radially of the axis for detaching the thighs from the bird.

The thighs are dislocated by a device comprising a pair of arms displaceable vertically in the respective station down against the thighs of the bird therein and a dorsal support displaceable vertically in the station up against the underside of the bird therein. The controller braces the bird in the respective station with the dorsal support and then brings the arms downward into engagement with the thighs to press same downward and dislocate same.

The fillet-thigh-wing subassembly or jacket is removed by a device comprising a carriage in the respective station displaceable generally radially of the axis toward and away from the axis and a pair of pinchers on the carriage spaced horizontally perpendicular to the direction of displacement of the carriage. The controller advances the carriage toward the bird in the respective station, then grips the thighs of the bird with the pinchers, and finally retracts the carriage and pincers to pull the subassembly off the bird. This device further comprises a support for radially bracing the bird on the respective holder in the respective station during retraction of the carriage.

Finally the apparatus of this invention is provided at a station immediately upstream of the unloading station with a V-shaped blade displaceable horizontally generally radially of the axis into the bird at the respective station for cutting the pygostyle from the bird.

DESCRIPTION OF THE DRAWINGS

The above and other objects, features, and advantages will become more readily apparent from the following, reference being made to the accompanying drawing in which:

FIG. 1 is a largely diagrammatic top view of an apparatus for carrying out the method of this invention;

FIG. 2 is a vertical section taken along plane 2S—2S of FIG. 1;

FIGS. 3, 4, and 5 are larger-scale side views of devices forming parts of the apparatus of FIG. 1;

FIG. 7 is a large-scale side view of another device according to this invention;

FIG. 8 is an end view of the device of FIG. 7; and

FIGS. 9 and 10, 11 and 12, and 13 and 14 are large-scale side and top views, respectively, of further devices according to this invention.

SPECIFIC DESCRIPTION

Figure 3:
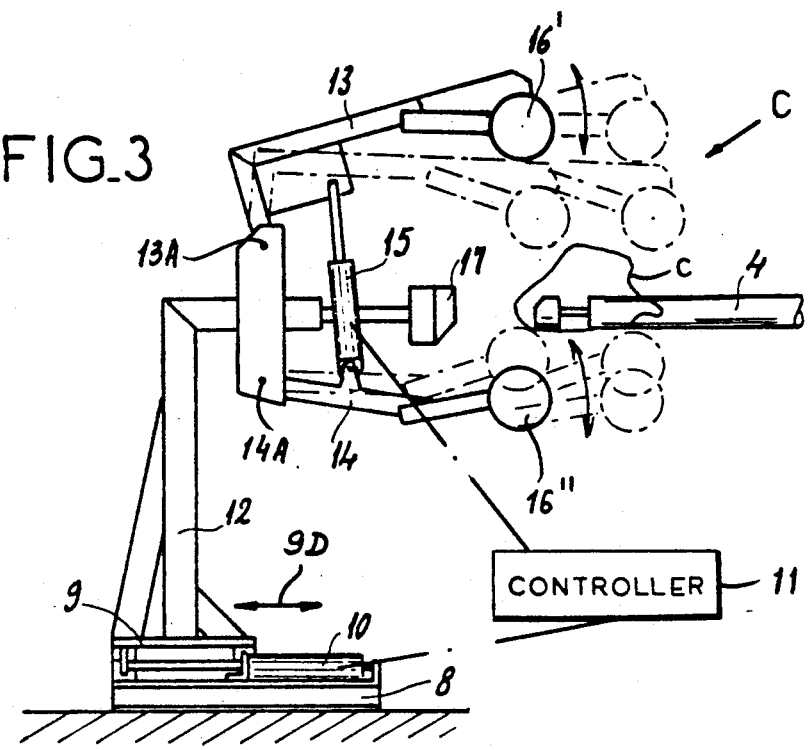

As seen in FIGS. 1 and 2 the apparatus according to the instant invention has a support 2 on which a turntable 3 is rotatable about a vertical axis 2A. This support 2 includes a drive which rotates the turntable 3 about the axis 2A in steps equal to 22.5° so that it takes sixteen steps to rotate the turntable 3 through a full revolution. The turntable 3 is provided with sixteen identical arms 4 each projecting radially and angularly equispaced about the axis 2A. The outer end of each arm 4 is provided with a holder 5 and a pair of spreadable wings 7 of the type described in commonly owned U.S. Pat. No. 4,656,692 to which reference should be made for further details. This holder 5 is adapted to fit in the thoracic cavity of a gutted bird carcass, normally a large bird like a turkey, to hold it with the sternum directed upward and the vertebral column horizontal and lying directly below the sternum. Surrounding the turntable 3 are sixteen treatment stations A–P through which the drive in the support 2 steps the holders 5. These stations A–P are spaced apart by 22.5°, just like the arms 4.

Figure 6:
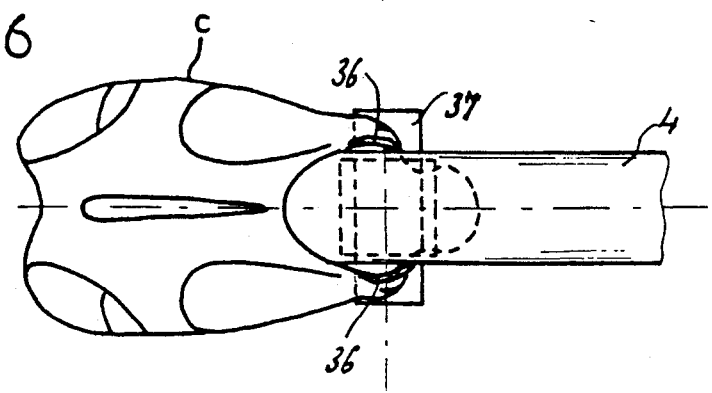
FIG. 6 is a top view of the device of FIG. 5.

At station A a carcass c is fitted to the holder 5 in the above-described position. This is assisted as shown in FIG. 6 by providing a support 6 on which the back of the carcass c is rested as it is slid onto the holder 5 before its head is advanced and wings 7 are extended as described in the above-cited patent.

In station B the fresh carcass c is acted on by a machine of the type described in commonly owned patent application 464,513 filed 12 Jan. 1990. This apparatus cuts the neck of the animal and also the tendons at the base of the neck. Reference should be made to the cited application for more details.

In station C as shown in FIG. 3 shallow incisions are made in the carcass c. This device has a base 8 on which a carriage 9 is displaceable in a direction 9D radially of the axis 2A by an actuator 10, here a hydraulic cylinder. An upright 12 on this carriage 9 supports upper and lower arms 13 and 14 pivotal about respective axes 13A and 14A which extend horizontally and in a plane perpendicular to the direction 9D. The outer end c of the upper arm 13 carries a double rotating blade 16' and the outer end of the lower arm carries a single rotating blade 16". Another actuator 15 extends between these arms 13 and 14 to push them away from each other and to pull them toward each other. The apparatus includes a controller 11 which is connected to the actuators 10 and 15 as well as to a sensor 17 carried on the support 12.

Once a carcass c is in the station C the sensor 17 is extended to detect its presence and position. Then the controller 11 shortens the actuator 15 to pull the two arms 13 and 14 toward each other while rotating the blades 16' and 16". Once these blades bite slightly into the upper and lower surfaces of the carcass c, the actuator 11 moves the carriage 9 radially inward toward the axis 2A to move the blades 16' and 16" the full length of the carcass c. This has the effect of forming a shallow double cut in the upper side of the carcass c to each side of the sternum thereof and a single such cut in the lower side thereof at the vertebral column. Once the blades 16' and 16" have moved radially inward past the carcass c the arms 13 and 14 are vertically spread and the carriage 9 is retracted. The depth of the cuts is determined by the force exerted by the actuator 15, and the lower blade 16" may be eliminated when the meat jacket separated from the carcass c as described below in station M is to be in one piece.

Stations D and E are used to partially free the fillets, that is the breast meat, from the carcass c. A cut is formed on one side of the sternum in the station D and on the other side in the station E. These cuts are made by an apparatus having a chain-type saw of the type described in commonly owned U.S. Pat. No. 4,793,232, mounted in an apparatus of the type described in commonly owned U.S. Pat. application 464,512 filed 12 Jan. 1990, to which reference should be made for further detail.

At station F as seen in FIG. 4 the coracoids are cut. This apparatus has a base 18 on which a support 19 can be pivoted about horizontal axis 19A perpendicular to the arm 4 extending into this station F. A carriage 20 carried on this support 19 can be displaced in a plane radial of the axis 2A by a cylinder 22 controlled by the controller 11. This carriage 20 supports a circular saw blade 23 rotated by a motor 24 about an axis lying in a vertical plane and perpendicular to the displacement direction 20D of the carriage 20. In addition this carriage 20 supports a sensing finger 25 connected to a detector 26 feeding input to the controller 11. A brace 27 engageable underneath the carcass c is operated by an actuator 28 to stabilize the carcass c during treatment in the station F.

Thus in station F the carriage 20 is advanced toward the carcass c until the detector 26 senses the presence of this carcass c. Meanwhile the brace 27 has been lifted to hold the carcass c solidly, and the actuator 22 pushes the rotating saw blade 23 into the carcass c to cut the coracoids 29. The depth of cut is determined by the finger 25 which stops the cylinder 22 from advancing the carriage 20 once the appropriate relatively shallow depth is achieved. The position of the saw can be adjusted along its rotation axis to allow the coracoids to be cut at the level desired by the user.

Figure 5:
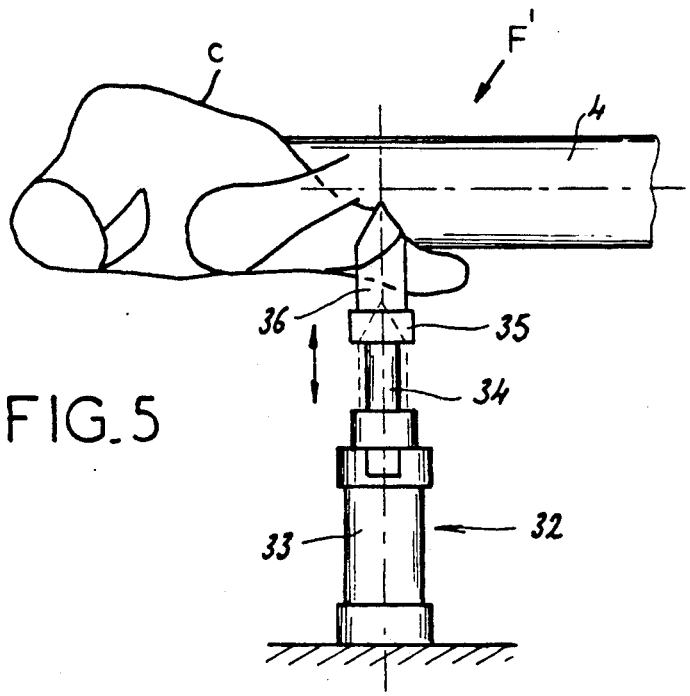

Station F includes substation F' shown in FIGS. 5 and 6 and comprising an apparatus having a base 32 formed by an actuator 33 that can vertically move a piston rod 34 on which is mounted a support 35 for a pair of identical upwardly pointed blades 36 lying in planes parallel to the axis of the respective arm 4 and serving to form a cut to each side of the ischium of the carcass c. Guides 37 are provided to automatically align the blades 36 parallel to the midline of the carcass c.

At station G the wings of the carcass c are at least partially detached along with the coracoids, the shoulder blades, and the front parts of the fillets. The apparatus at this station G is of the type described in commonly owned U.S. Pat. application 464,515 filed 12 Jan. 1990.

Subsequently the fillets are cut completely free from the carcass in stations H and J, nothing happening in station I, by devices identical to those used in stations D and E. Thus in stations H and J the freeing operations started in stations D and E are completed.

In station K as shown in FIGS. 7 and 8 horizontal cuts are made to each side of the ischium. This apparatus has a base 38 on which a carriage 40 is slidable radially of the axis 2A on tie rods 39. This carriage 40 carries a pair of symmetrically identical blades 41 held together by a spring 41a and each shaped to curve down over the carcass c, to which end they are concave toward this carcass c. As the blades 41 are pushed over the carcass c into the position indicated in dot-dash lines in FIG. 7 they form cuts which completely free the meat from the carcass.

In station L the two thighs of the legs of the turkey are dislocated from the carcass. This is achieved as shown in FIGS. 9 and 10 by an apparatus having a pair of arms 43 rotatable on a base 42 about an axis 43A that extends horizontally perpendicular to the axis of the arm 4 in this station L. These arms 43 are parallel to each other and extend perpendicularly from the axis 43, and could be moved between the upper solid-line position of FIG. 9 and the lower dot-dash line position by an actuator 45. A dorsal support 46 is provided for the carcass c, and is held in position thereagainst by another actuator 47 controlled like the actuator 45 from the controller 11.

Thus once the presence of the carcass c in the station L is detected the actuator 45 pivots down the arms 43, bringing them into engagement with the top of the loosened thighs, and bending them over to dislocate the joints connecting them to the carcass. After such dislocation the arms 43 are swung up and the support 46 is swung back out of the way, leaving the legs hanging loose from the carcass c.

In station M as shown in FIGS. 11 and 12 a jacket or subassembly comprised of the thighs, the fillets, and the wings is stripped off the carcass c. The apparatus for carrying this out comprises a horizontal rail 48 lying underneath the plane of displacement of the arm 4 and carrying a carriage 49 displaceable radially of the axis 2A. This carriage 49 has two pinchers 50 that are turned outward away from each other and that each are formed by a fixed inner part and a pivotal outer part. These pinchers 50 are shaped to grip the two thighs of the bird at the respective station M. The station M also is provided with a brace 52 that can pivot around a horizontal axis and that is adapted to engage behind the pygostyle of the bird, as well as a front stop 51 that can move axially of the arm 4 in the station M.

Once the presence of a carcass c is detected in this station M this carcass c is held in place by the stops 51 and 52. Then the carriage 49 is pushed until the pinchers 50 engage on the two thighs 53 of the carcass c. The outer parts of the pinchers 50 are closed inward and the carriage 49 is retracted to pull off the jacket comprised of the thighs, fillets, and wings and deposit them on a conveyor belt 54 (FIG. 1) which carries them away from the apparatus.

The partially stripped carcass c then passes through empty station N to station O where the pygostyle is removed by the apparatus shown in FIGS. 13 and 14. This apparatus comprises a stationary base 55 on which two identical arms 56 are pivotal about respective horizontal axes extending perpendicular to the arm 4 in the station O and horizontally therebelow. Pivoted on the upper ends of these arms 56 so as to form therewith and with the base 55 a parallellogrammatic linkage is a support 57 carrying a blade 58 having a V-shaped slot 59. A cylinder 60 is connected between the base 55 and one of the arms 56.

Thus once the carcass c is detected in the station O the cylinder 60 is retracted to move the blade 58 forward to engage over the pygostyle and separated from the body. Then the support 57 is pivoted back into its starting position.

Finally at station P the fully stripped carcass c is unloaded from the holder 5, typically by retracting its wings 7 and actuating its retractable head a few times to knock it loose. To this end a flap covers the upper part of the piston of the holder 5 to prevent the same from catching on the carcass c, so same can be deposited on a conveyor belt 61 (FIG. 1) and conducted away from the apparatus.

As can be seen from the preceding the apparatus and method according to this invention are particularly advantageous for cutting up fowl, such as turkeys, and for allowing one to remove the maximum amount of meat from the skeleton of the carcass. In addition the apparatus for carrying out the method of this invention can work at relatively high speeds because several operations are carried out at the same time. The only manual work is loading the machine. The devices at the various stations can be adjusted for the particular type and size of bird being processed relatively easily.

The instant invention is not restricted to the embodiment described above. On the contrary certain changes are within the scope of this invention as defined in the claims herebelow. More specifically:

Certain of the phases of the method can be inverted, that is switched with others.

The fillets can be entirely freed at the stations D and E.

If the fillets are completely freed in stations D and E the function of the stations H and J can be dropped and taken over at the station K.

The function of the device is at stations H and J can be carried out other than as described.

When the neck has already been cut from the turkey the device at station B can be eliminated, or this device can be used to cut off the stub of the neck and to loosen the neck tendons.

The coracoids can be cut not by horizontal saw as described above but by two vertical saws acting to each side of the sternum at the level of the joint of the coracoids with the sternum.

The method and apparatus of this invention can be used cold, warm, or hot.

We claim:

1. A method of cutting up a bird, the method comprising the steps of sequentially:
    a) cutting free the fillets;
    b) loosening the wings;
    c) dislocating the thighs; and
    d) removing as one piece a subassembly comprises of the thighs, the fillets, and the wings.

2. The method defined in claim 1 wherein the fillets are freed in two steps:
    a') before step b) cutting them partially from the skeleton starting from the sternum, and
    a") after step b) completing the cut, the method further comprising the step between steps a') and a") of
    cutting the coracoids, and after step d)
    ripping off the pygostyle.

3. The method defined in claim 1, further comprising before step a) the step of:
    fixing the bird on a holder that fits within the thoracic cavity of the bird, the bird remaining on this holder through all of steps a) through d).

4. The method defined in claim 1, further comprising before step a) the step of:
    cutting the neck and neck tendons off the bird.

5. The method defined in claim 1, further comprising the step before step a) of
    cutting a double incision into the skin of the bird along each side of the sternum.

6. The method defined in claim 1, further comprising the step of
    cutting into the skin of the bird along the vertebral column.

7. The method defined in claim 2, further comprising the step after cutting the coracoids of
    forming a vertical cut to each side of the ischium and a second horizontal cut thereabove, whereby the thigh meat is loosened.

8. An apparatus for cutting up birds the apparatus comprising:
    a turntable rotatable about an upright central axis and provided with a plurality of generally angularly equispaced holders adapted to fit within respective birds to be cut up radially generally equispaced from the axis;
    means for rotating the turntable through angular steps and thereby indexing the holders through respective treatment stations from an upstream loading station to a downstream unloading station;
    means at a station downstream of the loading station for partially freeing the fillets from the skeleton;
    means at a station downstream of the fillet-freeing station for cutting the coracoids;
    means at a station downstream of the coracoid-cutting station for cutting the wings;
    means at a second fillet-freeing station downstream of the wing-cutting station for completely freeing the fillets from the skeleton;
    means at a station downstream of the second fillet-freeing station for dislocating the thighs; and
    means downstream of the thigh-dislocating station and upstream of the unloading station for removing as one piece a subassembly comprises of the thighs, the fillets, and the wings.

9. The apparatus defined in claim 8, further comprising at a station between the first-mentioned fillet-freeing station and the loading station
    means for cutting a double incision into the skin of the bird along each side of the sternum and for cutting a single incision into the skin of the bird along the vertebral column, the cutting means including
    a carriage displaceable radially of the axis;
    upper and lower arms pivotal on the carriage about horizontal axes and having outer ends respectively positionable above and below the bird in the respective station generally at the sternum and vertebral column of the bird;
    a double rotary blade carried on one of the outer ends and engageable at the sternum;
    a single rotary blade carried on the other outer end and engageable at the vertebral column; and
    control means connected to the carriage, arms, and blades for detecting the presence of a bird in the respective station, pivoting the arms together while rotating the blades to cut into the bird, and displacing the carriage radially of the axis to make the respective incisions.

10. The apparatus defined in claim 8 wherein the means for cutting the coracoids includes:
    a carriage displaceable generally radially of the axis at the respective station;
    a flat and generally circular saw blade rotatable on the carriage about an upright axis generally perpendicular to the direction of displacement of the carriage;
    means for bracing the bird at the respective station; and control means connected to the carriage for detecting the presence of the bird in the respective station, bracing the bird, and advancing the saw blade while rotating it into the bird so as to cut the coracoids.

11. The apparatus defined in claim 8, further comprising
means including a pair of vertically displaceable blades at a station downstream of the coracoid-cutting station for forming a vertical cut to each side of the ischium of the bird.

12. The apparatus defined in claim 11 wherein the blades are pivotal about a vertical axis and are provided with means for automatically aligning them with the bird in the respective station.

13. The apparatus defined in claim 11, further comprising
means at a station downstream of the coracoid-cutting station including two blades displaceable radially of the axis for detaching the thighs from the bird.

14. The apparatus defined in claim 8 wherein the means for dislocating the thighs includes:
a pair of arms displaceable vertically in the respective station down against the thighs of the bird therein;
a dorsal support displaceable vertically in the station up against the underside of the bird therein; and
control means for bracing the bird in the respective station with the dorsal support and then bringing the arms downward into engagement with the thighs to press same downward and dislocate same.

15. The apparatus defined in claim 8 wherein the means for removing the fillet-thigh-wing subassembly comprises:
a carriage in the respective station displaceable generally radially of the axis toward and away from the axis;
a pair of pinchers on the carriage spaced horizontally perpendicular to the direction of displacement of the carriage; and
control means connected to the carriage and to the pincers for advancing the carriage toward the bird in the respective station, then gripping the thighs of the bird with the pinchers, and finally retracting the carriage and pincers to pull the subassembly off the bird.

16. The apparatus defined in claim 15 wherein the means for removing the subassembly further comprises
means for radially bracing the bird on the respective holder in the respective station during retraction of the carriage.

17. The apparatus defined in claim 8, further comprising at a station immediately upstream of the unloading station:
means including a V-shaped blade displaceable horizontally generally radially of the axis into the bird at the respective station for cutting the pygostyle from the bird.

* * * * *